US008599765B2

(12) United States Patent
Zhao et al.

(10) Patent No.: US 8,599,765 B2
(45) Date of Patent: Dec. 3, 2013

(54) EVOLVED PACKET SYSTEM QUALITY OF SERVICE ENFORCEMENT DEACTIVATION HANDLING TO PREVENT UNEXPECTED USER EQUIPMENT DETACH

(75) Inventors: Xiaoming Zhao, Plano, TX (US); Wei Wu, Coppell, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 874 days.

(21) Appl. No.: 12/052,890

(22) Filed: Mar. 21, 2008

(65) Prior Publication Data

US 2009/0239526 A1 Sep. 24, 2009

(51) Int. Cl.
*H04W 4/00* (2009.01)

(52) U.S. Cl.
USPC ............ 370/329; 370/328; 370/461; 370/462

(58) Field of Classification Search
USPC .................................. 370/328, 329
See application file for complete search history.

(56) References Cited

U.S. PATENT DOCUMENTS

| 7,801,480 | B2 * | 9/2010 | Becker ......................... 455/3.06 |
| 2003/0169704 | A1 * | 9/2003 | Okanoue ........................ 370/328 |
| 2004/0198365 | A1 * | 10/2004 | Verma et al. ................ 455/452.1 |
| 2005/0276256 | A1 * | 12/2005 | Raitola et al. .................. 370/349 |
| 2005/0282571 | A1 * | 12/2005 | Oprescu-Surcobe et al. 455/503 |
| 2006/0094478 | A1 * | 5/2006 | Kim et al. ....................... 455/574 |
| 2006/0153124 | A1 * | 7/2006 | Kant et al. ...................... 370/328 |
| 2006/0174009 | A1 * | 8/2006 | Martiquet et al. ............ 709/227 |
| 2007/0217419 | A1 * | 9/2007 | Vasseur .......................... 370/392 |
| 2008/0112322 | A1 * | 5/2008 | Bardalai ........................ 370/235 |
| 2008/0153454 | A1 * | 6/2008 | Haapapuro et al. ......... 455/404.1 |
| 2008/0267143 | A1 * | 10/2008 | Pasanen et al. ................ 370/338 |
| 2009/0043902 | A1 * | 2/2009 | Faccin ........................... 709/229 |
| 2009/0129342 | A1 * | 5/2009 | Hwang et al. ................. 370/331 |
| 2010/0008292 | A1 * | 1/2010 | Ludwig et al. ................ 370/328 |

FOREIGN PATENT DOCUMENTS

WO      0005913      2/2000

OTHER PUBLICATIONS

Ghadialy, Zahid, "A look at PDP Context in UMTS networks", http://www.3g4g.co.uk/Tutorial/ZG/zg_pdp, archive date Dec. 16, 2007.*

3GPP TS 23.401 V8.0.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Dec. 2007; pp. 1-6 and 70-73.

3GPP TS 23.402 V8.0.0; 3rd Generation Partnership Project; Technical Specification Group Services and System Aspects; Architecture Enhancements for non-3GPP Accesses; Release 8; Dec. 2007; pp. 1-7 and 62-68.

(Continued)

*Primary Examiner* — Brandon Renner
*Assistant Examiner* — Scott M Sciacca
(74) *Attorney, Agent, or Firm* — Conley Rose, P.C.; J. Robert Brown, Jr.

(57) ABSTRACT

A system of a telecommunications network is provided. The system includes a processor configured to promote preventing a detachment of a user equipment (UE) from the network by preventing deactivation of at least one default bearer between the UE and the network when at least one bearer between the UE and the network is to be deactivated based on a quality of service parameter.

4 Claims, 5 Drawing Sheets

(56) References Cited

OTHER PUBLICATIONS

3GPP TS 23.401 V8.0.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Dec. 2007; pp. 1-84; Part 1.

3GPP TS 23.401 V8.0.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Dec. 2007; pp. 85-167; Part 2.

European Search Report; EP Application No. 08153855.5; Aug. 29, 2008; 8 pgs.

* cited by examiner

EVOLVED PACKET SYSTEM QUALITY OF SERVICE ENFORCEMENT DEACTIVATION HANDLING TO PREVENT UNEXPECTED USER EQUIPMENT DETACH

BACKGROUND

Easily transportable devices with wireless telecommunications capabilities, such as mobile telephones, personal digital assistants, handheld computers, and similar devices, will be referred to herein as user equipment (UE). The term "UE" may refer to a device and its associated Universal Integrated Circuit Card (UICC) that includes a Subscriber Identity Module (SIM) application, a Universal Subscriber Identity Module (USIM) application, or a Removable User Identity Module (R-UIM) application or may refer to the device itself without such a card. The term "UE" may also refer to devices that have similar capabilities but that are not transportable, such as a desktop computer or a set-top box. A connection between a UE and some other element in a telecommunications network might promote a voice call, a file transfer, or some other type of data exchange, any of which can be referred to as a call or a session.

Some UEs communicate in a circuit switched mode, wherein a dedicated communication path exists between two devices. For the duration of a call or session, all data exchanged between the two devices travels along the single path. Some UEs have the capability to communicate in a packet switched mode, wherein a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers.

Communications that take place via circuit switching can be said to occur in the circuit switched domain and communications that take place via packet switching can be said to occur in the packet switched domain. Within each domain, several different types of networks, protocols, or technologies can be used. In some cases, the same network, protocol, or technology can be used in both domains. The wireless communication networks may be based on Code Division Multiple Access (CDMA), Time Division Multiple Access (TDMA), Frequency Division Multiple Access (FDMA), Orthogonal Frequency Division Multiplexing (OFDM), or some other multiple access scheme. A CDMA-based network may implement one or more standards such as 3GPP2 IS-2000 (commonly referred to as CDMA 1x), 3GPP2 IS-856 (commonly referred to as CDMA 1xEV-DO), or 3GPP UMTS (Universal Mobile Telecommunications System). The modes of access for UMTS are referred to as Universal Terrestrial Radio Access (UTRA). A TDMA-based network may implement one or more standards such as 3GPP Global System for Mobile Communications (GSM) or 3GPP General Packet Radio Service (GPRS).

GSM is an example of a wireless network standard that uses only the circuit switching mode. Examples of wireless network standards that use only packet switching include GPRS, CDMA 1x EV-DO, Worldwide Interoperability for Microwave Access (WiMax), and Wireless Local Area Network (WLAN), which might comply with Institute of Electrical and Electronics Engineers (IEEE) standards such as 802.16, 802.16e, 802.11a, 802.11b, 802.11g, 802.11n, and similar standards. Examples of wireless network standards that may use both circuit switching and packet switching modes include CDMA 1x and UMTS. The IP (Internet Protocol) Multimedia Subsystem (IMS) is a packet switched technology that allows multimedia content to be transmitted between UEs.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS).

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to one embodiment, a system of a telecommunications network is provided. The system includes a processor configured to promote preventing a detachment of a user equipment (UE) from the network by preventing deactivation of at least one default bearer between the UE and the network when at least one bearer between the UE and the network is to be deactivated based on a quality of service parameter.

In another embodiment, a method is provided for preventing a detachment of a user equipment (UE) from a network. The method includes when at least one bearer between the UE and the network is to be deactivated based on a quality of service parameter, preventing deactivation of at least one default bearer between the UE and the network.

Figure 1:
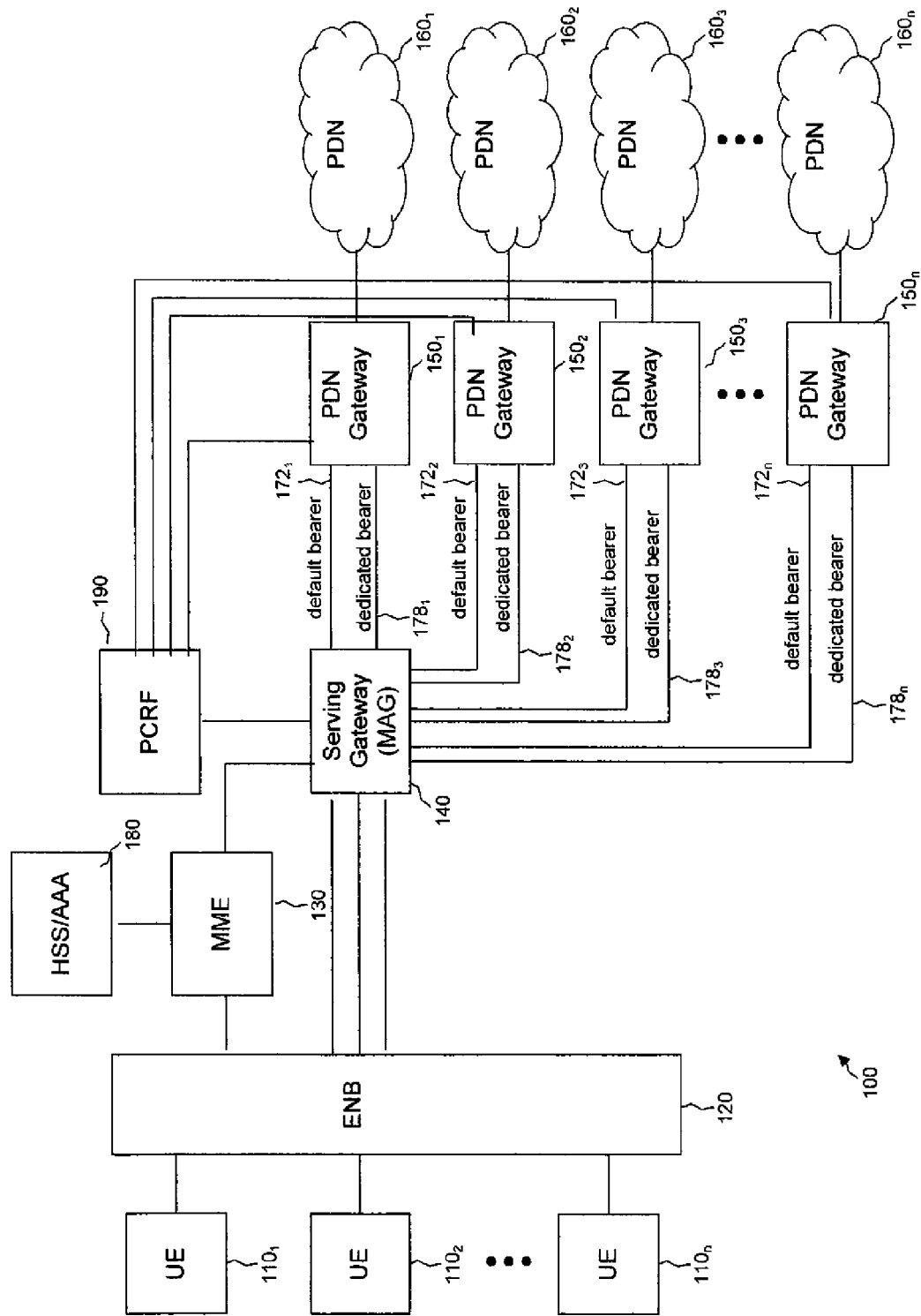
FIG. 1 is an illustration of a wireless telecommunications system according to an embodiment of the disclosure.

FIG. 1 illustrates an exemplary wireless telecommunications system 100 according to an embodiment of the disclosure. It should be noted that some of the lines connecting the components in FIG. 1 might represent bearer connections and some of the lines might represent signaling connections. Traditionally, different styles of lines are used to represent the different types of connections. However, for the sake of clarity in the drawing, the different types of connections in FIG. 1 are represented by the same style of line. Also, other connections that are not shown might exist between the components in FIG. 1.

The system 100 includes a plurality of UEs 110 each of which can connect to a plurality of packet data networks (PDNs) 160. The PDNs 160 might be Internet-based networks or might be other types of networks that can provide packet-based data. The PDNs 160 could also be considered to be access point names (APNs). Each PDN 160 can allow access to packet-based services, such as World Wide Web pages, multimedia broadcast/multicast services, and other data packet-based services. To access the PDNs 160, the UEs 110 might first establish one or more radio bearer connections with an ENB 120, a base station, or a similar component. While only one ENB 120 is shown, multiple ENBs 120 could be present.

In some cases, the UEs 110 may connect, via the radio bearer connections and the ENB 120, to a serving gateway 140, which can also be referred to as a mobile access gateway (MAG). The serving gateway 140 terminates the user plane interface of the radio access portions of the system 100. The UEs 110 may connect, via the ENB 120, to mobility management entity (MME) 130. The mobility management entity (MME) 130 terminates the control plane interface of the radio access portions of the system 100. The serving gateway 140 forwards packets to the PDNs 160 via a plurality of PDN gateways 150. While each PDN gateway 150 is shown providing access to only one PDN 160, each PDN gateway 150 might provide access to a plurality of PDNs 160.

Multiple bearers may be established between the serving gateway 140 and each of the PDN gateways 150. An initial connection between one of the PDN gateways 150 and the serving gateway 140 is known as a default bearer 172 for that PDN gateway 150. The default bearer 172 is typically a non-guaranteed bit rate (non-GBR) connection so that "always on" connectivity can be supported.

After the default bearer 172 is connected to one of the PDN gateways 150, any additional connections that are made from the serving gateway 140 to that PDN gateway 150 are known as dedicated bearers 178. Based on the UEs' quality of service (QoS) profiles, the dedicated bearers 178 might conform to a set of QoS requirements, such as a guaranteed bit rate (GBR), a maximum bit rate (MBR), a packet delay budget (PDB), and other parameters of data transfer quality. In FIG. 1, only one dedicated bearer 178 connects each of the PDN gateways 150 to the serving gateway 140, but in other cases there could be no dedicated bearers 178 or multiple dedicated bearers 178 to each PDN gateway 150.

A home subscriber server (HSS)/authentication/authorization accounting server (AAA) 180, or a similar component, can connect to the MME 130 and can store data related to services available to the UEs 110, billing policies for the UEs 110, and similar UE profile data. If dynamic policy and charge control (PCC) rules are deployed in the system 100, a policy control and charging rules function (PCRF) 190, or a similar component might be present. The PCRF 190 can connect to the serving gateway 140 and the PDN gateways 150 and can store policies related to the connections from the ENB 120 to the PDN gateways 150.

Some of the UEs 110 might connect to two or more PDN gateways 150 concurrently via the serving gateway 140. This could provide the UEs 110 with fast access to multiple PDNs 160. For example, one of the UEs 110 might connect to PDN $160_1$ in order to access the World Wide Web and might connect to PDN $160_2$ in order to access a video download. If concurrent bearers exist to both PDN gateway $150_1$ and PDN gateway $150_2$, the user could quickly switch between accessing PDN $160_1$ and PDN $160_2$. If concurrent bearers were not possible and the user wished to switch from PDN $160_1$ to PDN $160_2$, an existing bearer might need to be torn down and a new bearer established at the time access to PDN $160_2$ was attempted.

One of the UEs 110 that is connected to one or more of the PDNs 160 could be detached from one or more of the PDNs 160 as a result of a request from the UE 110. Alternatively, a UE detachment could be initiated by another component in the system 100. For example, the MME 130 might detach one of the UEs 110 as a result of the MME 130 not receiving a keep-alive response from the UE 110, or the HSS/AAA 180 might detach one of the UEs 110 based on a service expiring or being disallowed.

In addition, a detachment of one of the UEs 110 could occur based on the UE's QoS parameters. Under congestion conditions, it is possible that the total bandwidth needed by the UEs 110 over all of the default bearers 172 and dedicated bearers 178 could exceed the total bandwidth available from the PDNs 160. In such cases, the PCRF 190 or one or more of the PDN gateways 150 might determine whether the deactivation of one or more of the default bearers 172 and/or dedicated bearers 178 could decrease bandwidth usage to a level within the capacity of the PDNs 160. If such a deactivation would sufficiently reduce bandwidth usage, the PCRF 190 or one or more of the PDN gateways 150 might deactivate one or more of the default bearers 172 and/or one or more of the dedicated bearers 178.

If dynamic PCC is deployed in the system 100, the PCRF 190 might make the decisions of whether to deactivate one or more bearers and which bearers to deactivate. If dynamic PCC is not deployed in the system 100, one or more of the PDN gateways 150 might make these decisions. The decision of which bearers to deactivate might be based on the QoS parameters of the UEs 110 that are connected to the bearers. Bearers connecting UEs 110 with higher priorities, possibly obtained through higher service fees paid by the UE user, might remain activated. Bearers connecting UEs 110 with lower priorities might be deactivated to make bandwidth available for the high-priority UEs 110.

If one of the UEs 110 has multiple PDN connections, it may be acceptable to deactivate some or most of the bearers between the UE 110 and the PDNs 160. However, if all of the bearers between the UE 110 and the PDNs 160 are deactivated, including the default bearers 172, the UE 110 could enter a detached or deregistered state, which may be unacceptable even for low-priority UEs 110. Thus, bearer deactivation based on QoS enforcement could lead to unexpected UE detachments.

In an embodiment of the present disclosure, an unexpected UE detachment caused by enforcement of this QoS-based bearer deactivation procedure can be prevented by ensuring that at least one default bearer 172 remains active between the UE 110 and at least one of the PDNs 160. In an embodiment, this can be accomplished in one of two ways. In a first option, QoS policies are modified to trigger the PCRF-initiated or PDN gateway-initiated bearer deactivation procedure only for dedicated bearers 178, and not for default bearers 172. In this way, the active default bearer connections 172 of each of the UEs 110 to the PDNs 160 are retained, and UE detachments due to QoS enforcement do not occur. In some cases, some of the dedicated bearer connections 178 might also be retained.

In a second option, the QoS policies allow the PCRF 190 or the PDN gateways 150 to initiate deactivation of both the default bearers 172 and the dedicated bearers 178. However, the bearer deactivation procedure is modified such that, for each UE 110, at least one message to deactivate one of the default bearers 172 is rejected. Such a rejection is valid only for the authenticated and authorized UE 110 and it ensures that at least one default bearer 172 is retained for each UE 110 and thus prevents UE detachment by preserving at least one PDN-to-UE connection. Deactivation requests related to the dedicated bearers 178 might be allowed, and the dedicated bearers 178 might be deactivated as described above.

As an example, UE $110_1$ might be connected to PDN gateway $150_1$ via default bearer $172_1$ and dedicated bearer $178_1$ and to PDN gateway $150_2$ via default bearer $172_2$ and dedicated bearer $178_2$. If UE $110_1$ is a low-priority UE and if congestion conditions exist, a decision might be made to deactivate some or all of UE $110_1$'s bearers $172_1$, $178_1$, $172_2$, and/or $178_2$. Messages might be transmitted among the components of the system 100 to carry out the deactivations. In an embodiment, at least one of these messages is rejected for default bearer $172_1$, default bearer $172_2$, or both, and default bearer $172_1$, default bearer $172_2$, or both remain active.

The decision of whether to reject deactivation of default bearer $172_1$, default bearer $172_2$, or both can be based on an operator-dependent policy that is established prior to implementation of the bearer deactivation procedure. For example, an operator of the network 100 or of a component of the network 100 might specify that all requests to deactivate default bearers 172 are to be rejected. This could allow the UE 110 to remain connected via at least one bearer to every PDN gateway 150 to which it was previously connected. Alternatively, the operator might specify that all requests to deactivate default bearers 172 and dedicated bearers 178 are to be allowed until no dedicated bearers 178 are active and only one default bearer 172 remains active. This could allow the UE 110 to remain connected via a single bearer to a single PDN gateway 150. Alternatively, the operator might specify that some other number of default bearers 172 are to remain active.

The rejection of a message to deactivate one of the default bearers 172 might be carried out by either the serving gateway 140, the MME 120, or one of the UEs 110. One of these components might send a "Delete Bearer Request Reject" message, or a similar message, to the PDN gateway 150 to which the connection is to be maintained after receiving a "Delete Bearer Request" message, or a similar message, from that PDN gateway 150 or from the PCRF 190. The Delete Bearer Request Reject message can include the identity of the default bearer that is to be retained and a rejection cause indicating that a default bearer connection is being retained. If dynamic PCC is deployed, the rejection information can also be included in a Provision message to the PCRF 190.

Figure 2:
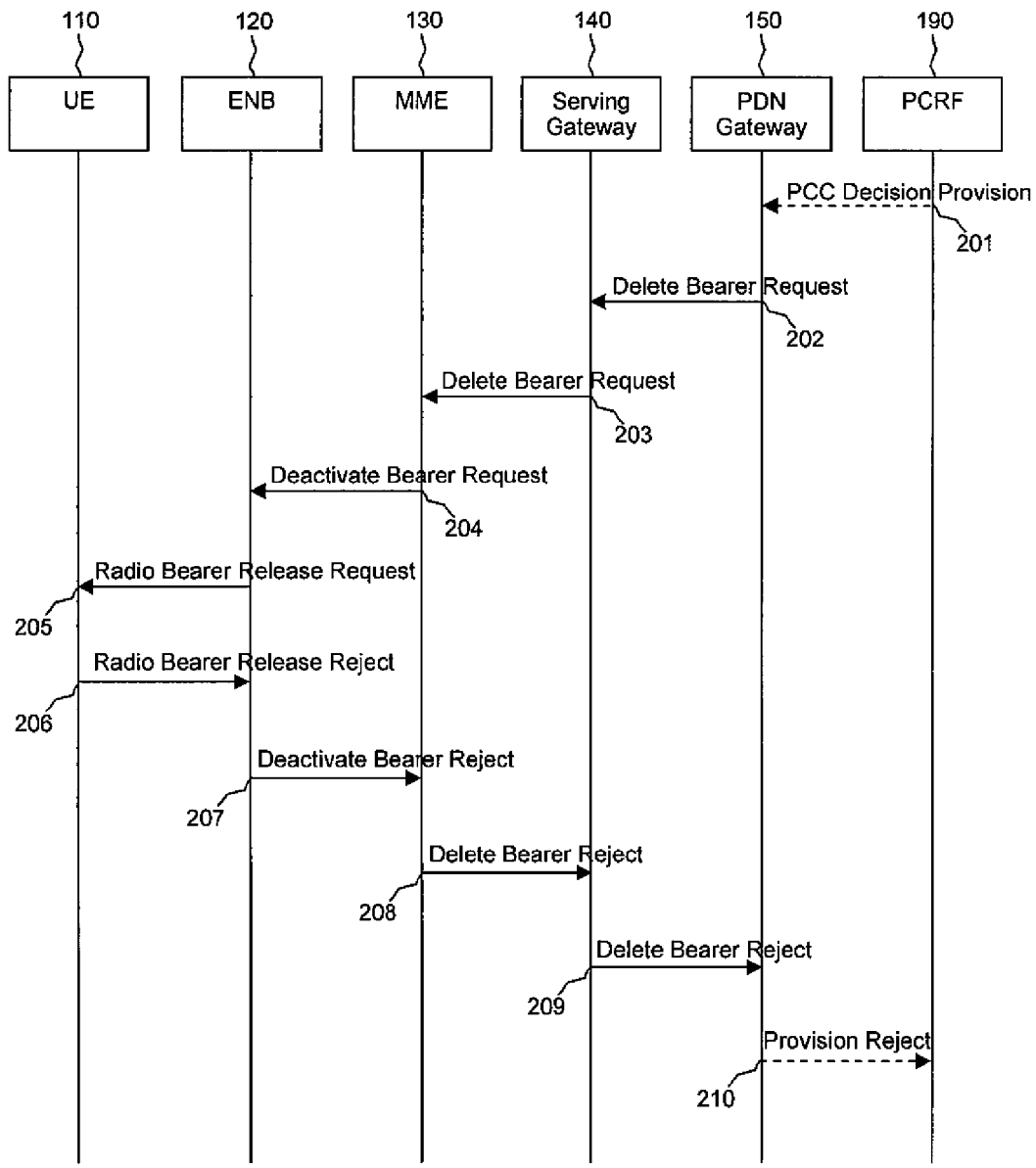
FIG. 2 is a call flow diagram for preventing the detachment of a UE according to an embodiment of the disclosure.

FIG. 2 illustrates an embodiment of a call flow diagram for preventing the detachment of the UE 110 by the second of these two options. In this embodiment, the UE 110 makes a decision to reject a bearer release request. In other embodiments, as described below, the decision to reject a bearer release request could be made by the MME 130 or the serving gateway 140.

At event 201, it has been decided that the bearer deactivation procedure is to be initiated to free bandwidth for high-priority users. If dynamic PCC is not deployed, one of the PDN gateways 150 initiates the bearer deactivation procedure according to a local QoS policy. Optionally, if dynamic PCC is deployed, the PCRF 190 initiates the bearer deactivation procedure by sending a PCC Decision Provision message to the PDN gateway 150.

At event 202, the PDN gateway 150 sends a Delete Bearer Request message with the ID of the bearer to be deactivated to the serving gateway 140. At event 203, the serving gateway 140 sends the Delete Bearer Request message with the bearer ID to the MME 130. This message can include an indication that all bearers to the PDN 150 are to be deactivated. At event 204, the MME 130 sends the Deactivate Bearer Request message with the bearer ID to the ENB 120. At event 205, the ENB 120 sends a Radio Bearer Release Request message with the bearer ID to the UE 110.

At event 206, the UE 110 decides that this bearer needs to be retained for always-on connectivity and rejects the request to deactivate the bearer. For example, the UE 110 might determine that this bearer is the last default bearer connecting the UE 110 to a PDN. The UE 110 then sends the ENB 120 a Radio Bearer Release Reject message with a "reject cause" parameter, or a similar parameter, set to a value of "keep always-on connectivity", or a similar value.

At event 207, the ENB 120 acknowledges the bearer deactivation rejection to the MME 130 with the bearer ID and the reject cause. At event 208, the MME 130 acknowledges the bearer deactivation rejection to the serving gateway 140 with the bearer ID and the reject cause. At event 209, the serving gateway 140 acknowledges the bearer deactivation rejection to the PDN gateway 150 with the bearer ID and the reject cause. At event 210, if the bearer deactivation procedure was triggered by a PCC Decision Provision message from the PCRF 190 at event 201, the PDN gateway 150 indicates to the PCRF 190 that the requested PCC decision was rejected by sending a Provision Reject message with a rejection cause.

In alternative embodiments, the decision to reject the request to deactivate the bearer could be made by the MME 130 or by the serving gateway 140, since the MME 130 and the serving gateway 140 have information on all of the bearer types and IDs for all of the PDN gateways 150 to which the UE 110 is connected. For example, at event 204, the MME 130 might determine that this bearer is the last default bearer connecting the UE 110 to a PDN. Then, instead of the MME 130 sending the Delete Bearer Request message to the ENB 120, the MME 130 might send the serving gateway 140 a Delete Bearer Reject message, as shown at event 208. Events 209 and 210 could then occur, and events 205 through 207 could be eliminated.

Alternatively, at event 203, the serving gateway 140 might determine that this bearer is the last default bearer connecting the UE 110 to a PDN. Then, instead of the serving gateway 140 sending the Delete Bearer Request message to the MME 130, the serving gateway 140 might send the PDN gateway 150 a Delete Bearer Reject message, as shown at event 209. Event 210 could then occur, and events 204 through 208 could be eliminated.

The determination of whether the serving gateway 140, the MME 130, or one of the UEs 110 controls the retention of at least one default bearer 172 by sending Delete Bearer Request Rejection messages can be an implementation-dependent detail. It can be seen in FIG. 2 that messaging overhead can be saved if the decision is made early in the bearer deactivation procedure.

If the first of the two options for preventing the detachment of the UE 110 had been followed instead of this second option, the QoS policies in the PDN gateways 150 or the PCRF 190 would have prevented the deactivation of any default bearers. In that case, none of the events depicted in FIG. 2 would occur for default bearers, and events 201 through 205 might occur only for dedicated bearers. The messages to deactivate a bearer might not be rejected in that case, and therefore events 206 through 210 might not occur for dedicated bearers. Instead the events 206 through 210 shall be replaced by the response messages with the requested bearer deleting actions.

Figure 3:
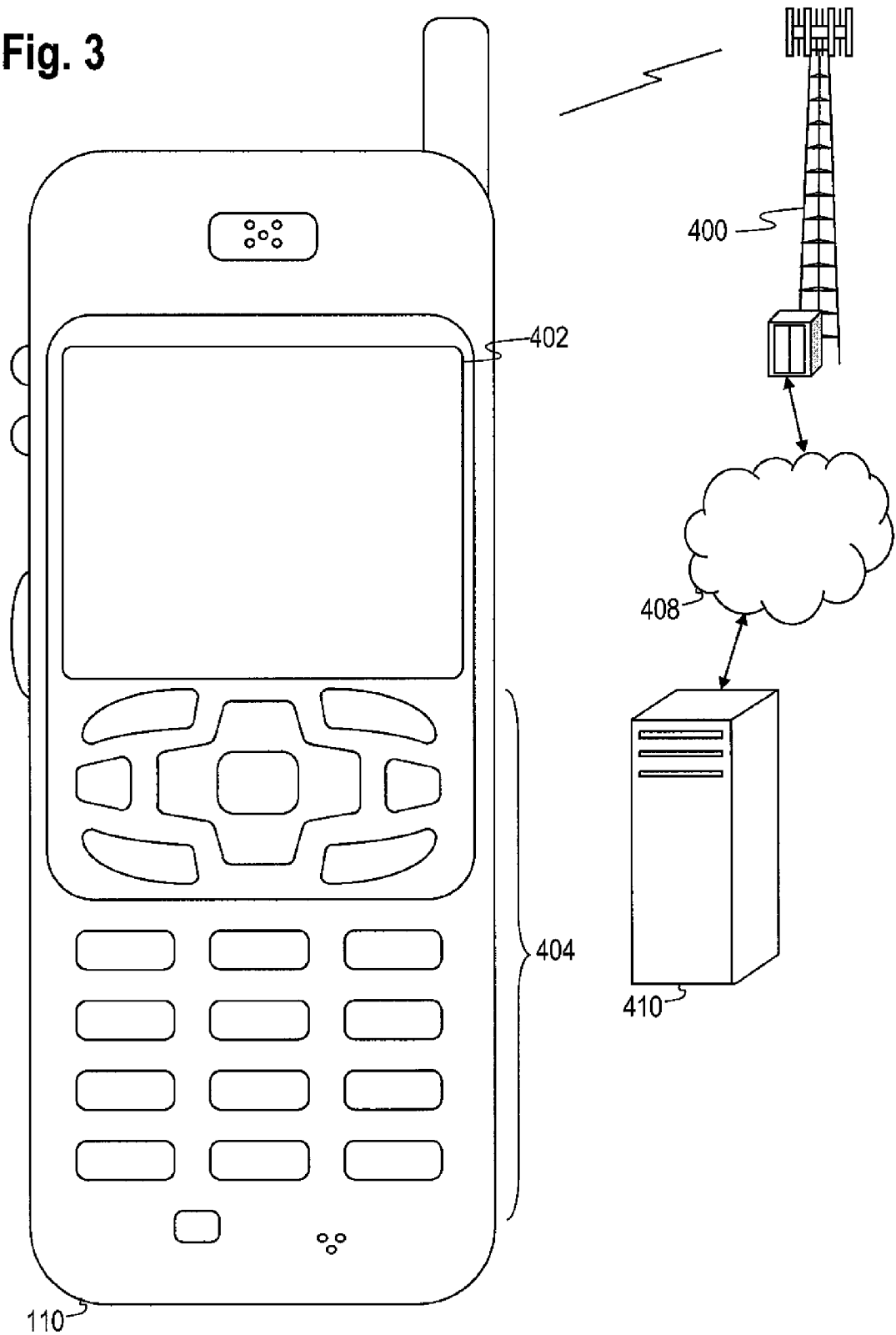
FIG. 3 is a diagram of a wireless communications system including user equipment operable for some of the various embodiments of the disclosure.

FIG. 3 illustrates a wireless communications system including an embodiment of the UE 110. The UE 110 is operable for implementing aspects of the disclosure, but the disclosure should not be limited to these implementations. Though illustrated as a mobile phone, the UE 110 may take various forms including a wireless handset, a pager, a personal digital assistant (PDA), a portable computer, a tablet computer, or a laptop computer. Many suitable devices combine some or all of these functions. In some embodiments of the disclosure, the UE 110 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 110 may be a portable, laptop or other computing device. The UE 110 may support specialized activities such as gaming, inventory control, job control, and/or task management functions, and so on.

The UE 110 includes a display 402. The UE 110 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 110 may present options for the user to select, controls for the user to actuate, and/or cursors or other indicators for the user to direct.

The UE 110 may further accept data entry from the user, including numbers to dial or various parameter values for configuring the operation of the UE 110. The UE 110 may further execute one or more software or firmware applications in response to user commands. These applications may configure the UE 110 to perform various customized functions in response to user interaction. Additionally, the UE 110 may be programmed and/or configured over-the-air, for example from a wireless base station, a wireless access point, or a peer UE 110.

Among the various applications executable by the UE 110 are a web browser, which enables the display 402 to show a web page. The web page may be obtained via wireless communications with a wireless network access node, a cell tower, a peer UE 110, or any other wireless communication network or system 400. The network 400 is coupled to a wired network 408, such as the Internet. Via the wireless link and the wired network, the UE 110 has access to information on various servers, such as a server 410. The server 410 may provide content that may be shown on the display 402. Alternately, the UE 110 may access the network 400 through a peer UE 110 acting as an intermediary, in a relay type or hop type of connection.

Figure 4:
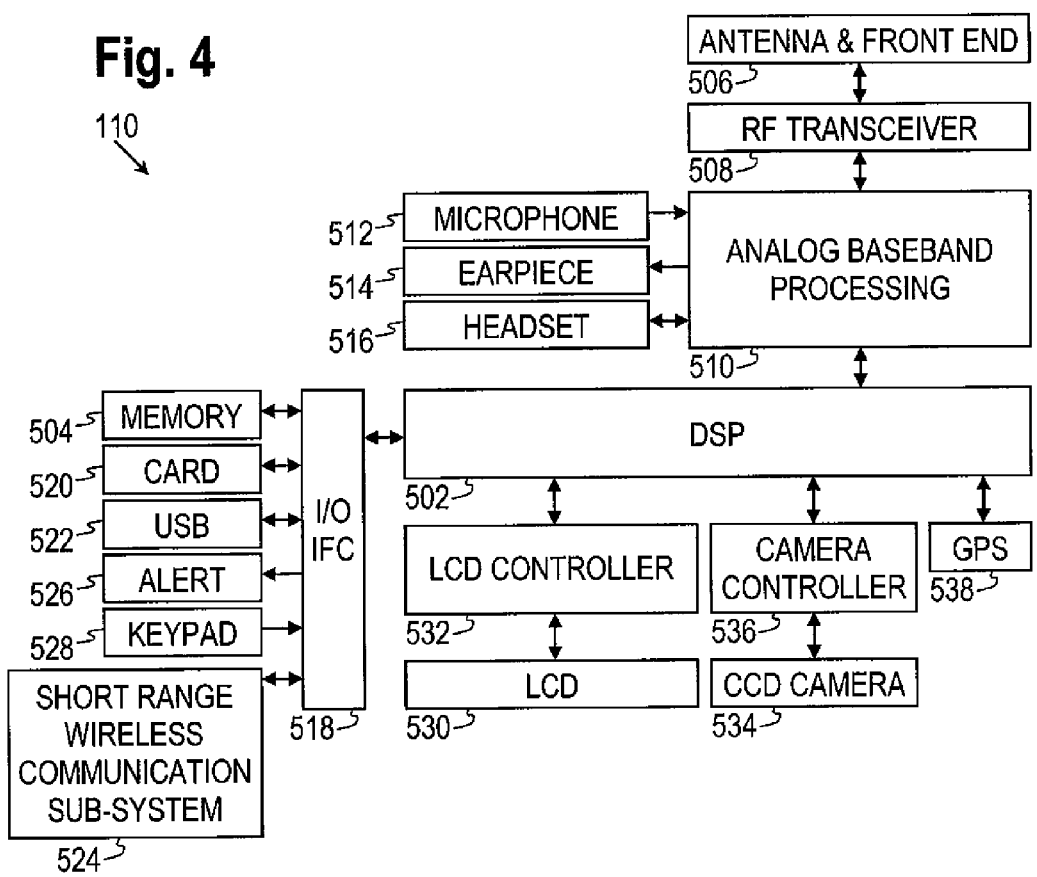
FIG. 4 is a block diagram of user equipment operable for some of the various embodiments of the disclosure.

FIG. 4 shows a block diagram of the UE 110. While a variety of known components of UEs 110 are depicted, in an embodiment a subset of the listed components and/or additional components not listed may be included in the UE 110. The UE 110 includes a digital signal processor (DSP) 502 and a memory 504. As shown, the UE 110 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 110 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 110 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 110 to send and receive information from a cellular network or some other available wireless communications network or from a peer UE 110. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 110 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 110 and may also enable the UE 110 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 110 to communicate wirelessly with other nearby mobile devices and/or wireless base stations.

The input/output interface 518 may further connect the DSP 502 to the alert 526 that, when triggered, causes the UE 110 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 110. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 110 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 110 to determine its position. Various other peripherals may also be included to provide additional functions, e.g., radio and television reception.

Figure 5:
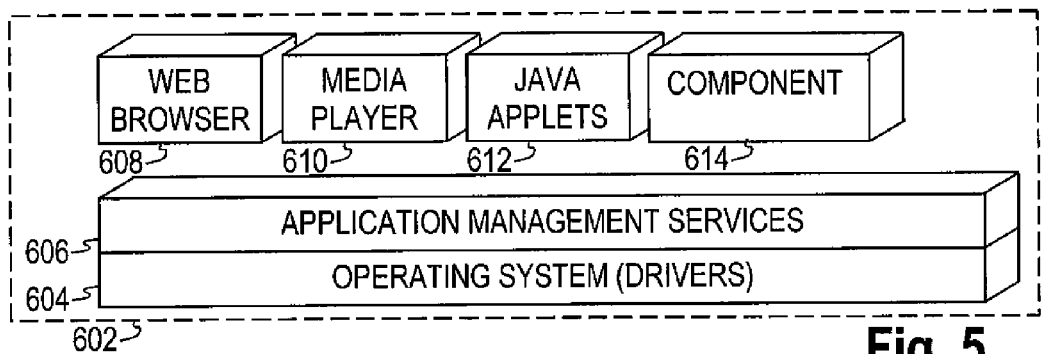
FIG. 5 is a diagram of a software environment that may be implemented on user equipment operable for some of the various embodiments of the disclosure.

FIG. 5 illustrates a software environment 602 that may be implemented by the DSP 502. The DSP 502 executes operating system drivers 604 that provide a platform from which the rest of the software operates. The operating system drivers 604 provide drivers for the UE hardware with standardized interfaces that are accessible to application software. The operating system drivers 604 include application management services ("AMS") 606 that transfer control between applications running on the UE 110. Also shown in FIG. 5 are a web browser application 608, a media player application 610, and Java applets 612. The web browser application 608 configures the UE 110 to operate as a web browser, allowing a user to enter information into forms and select links to retrieve and view web pages. The media player application 610 configures the UE 110 to retrieve and play audio or audiovisual media. The Java applets 612 configure the UE 110 to provide games, utilities, and other functionality. A component 614 might provide functionality related to UE detachment.

Figure 6:
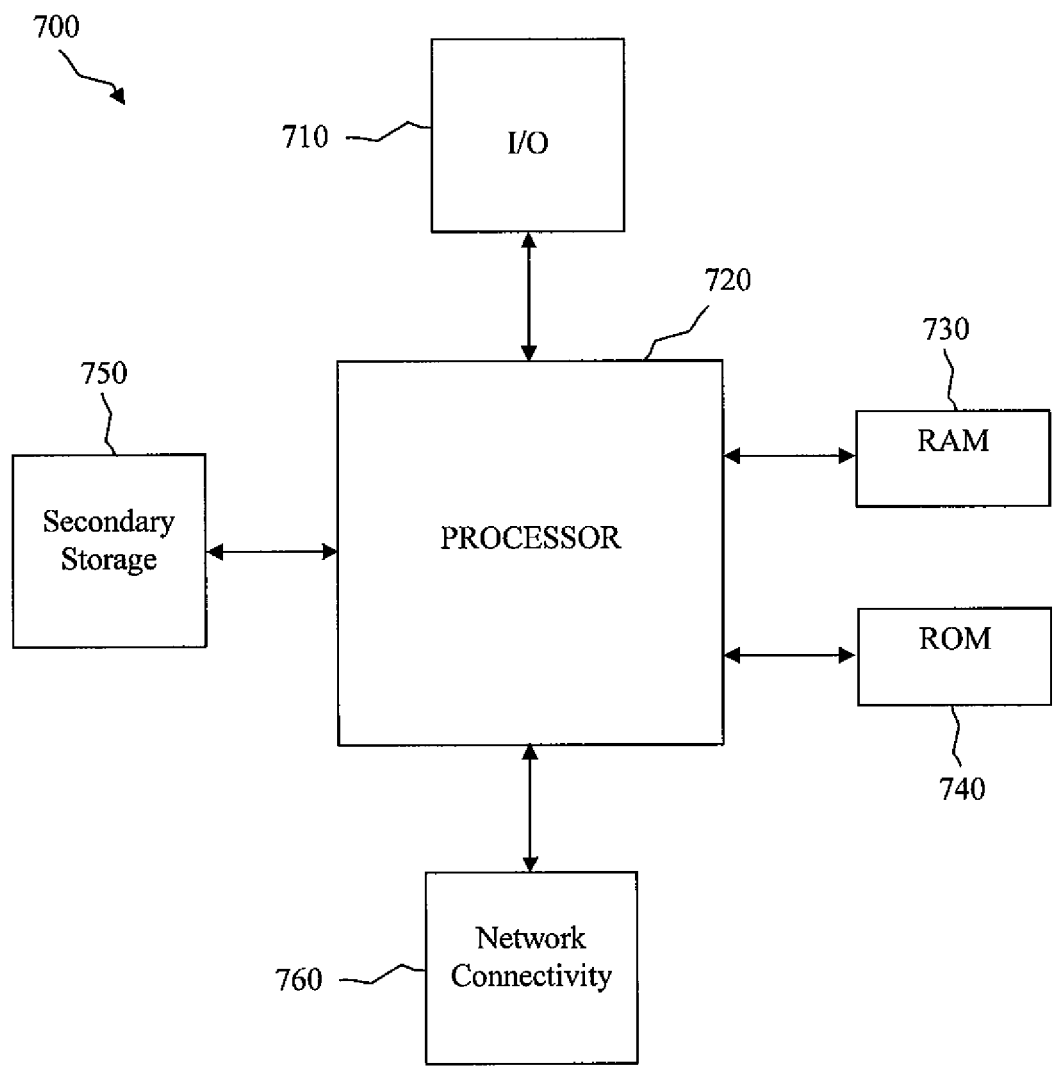
FIG. 6 is an illustrative general purpose computer system suitable for some of the various embodiments of the disclosure.

The UE 110 and other components of FIG. 1 may include any general-purpose computer with sufficient processing power, memory resources, and network throughput capability to handle the necessary workload placed upon it. FIG. 6 illustrates a typical, general-purpose computer system 700 that may be suitable for implementing one or more embodiments disclosed herein. The computer system 700 includes a processor 720 (which may be referred to as a central processor unit or CPU) that is in communication with memory devices including secondary storage 750, read only memory (ROM) 740, random access memory (RAM) 730, input/output (I/O) devices 710, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk-based systems may all be considered secondary storage 750), ROM 740, RAM 730, or the network connectivity devices 760. While only one processor 720 is shown, multiple processors may be present. Thus, while instructions may be discussed as executed by a processor, the instructions may be executed simultaneously, serially, or otherwise executed by one or multiple processors.

The following are incorporated herein by reference for all purposes: 3$^{rd}$ Generation Partnership Project (3GPP) Technical Specification (TS) 23.401 and 3GPP TS 23.402.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for preventing a detachment of a user equipment (UE) from a network, comprising:
   determining, by a mobility management entity, that a default bearer between the UE and the network is a last default bearer connecting the UE to the network,
   preventing deactivation of the default bearer between the UE and the network when at least one bearer between the UE and the network is to be deactivated based on a quality of service parameter,
   wherein the default bearer and the at least one bearer are associated with a serving gateway,
   wherein preventing deactivation of the default bearer between the UE and the network is accomplished by rejecting a request to deactivate the at least one bearer when deactivating the at least one bearer would result in an unexpected UE detachment from the network, and
   wherein rejecting the request to deactivate the at least one bearer is implemented by the mobility management entity,
   wherein the quality of service parameter of the UE is a priority level of the UE, and wherein a decision is made to deactivate the at least one bearer when the priority level of the UE is lower than a priority level of another UE connected to the network.

2. A mobility management entity, comprising:
   a processor configured to prevent a detachment of a user equipment (UE) from a network by preventing deactivation of at least one default bearer between the UE and the network when at least one bearer between the UE and the network is to be deactivated based on a quality of service parameter,
   wherein the at least one default bearer is an initial connection of the UE to the network,
   wherein the quality of service parameter of the UE is a priority level of the UE,
   wherein the priority level is based on service fees paid by the UE user,
   wherein the at least one bearer is to be deactivated when the priority level of the UE is lower than a priority level of another UE connected to the network, and
   wherein the at least one default bearer and the at least one bearer are associated with a serving gateway,
   wherein the deactivation of at least one default bearer between the UE and the network is prevented by rejecting a request to deactivate the at least one bearer,
   wherein rejecting the request to deactivate is performed by the mobility management entity.

3. The mobility management entity of claim 2, wherein the mobility management entity prevents deactivation of at least one default bearer between the UE and the network by implementing a policy specifying that deactivation of default bearers is not allowed.

4. The mobility management entity of claim 3, wherein the policy is provided by one of:
   a packet data network gateway; and
   a policy control and charging rules function.

* * * * *